US012689124B2

(12) United States Patent
Onaka et al.

(10) Patent No.: US 12,689,124 B2
(45) Date of Patent: Jul. 21, 2026

(54) ANTENNA MODULE AND COMMUNICATION APPARATUS EQUIPPED WITH THE SAME

(71) Applicant: Murata Manufacturing Co., Ltd., Nagaokakyo (JP)

(72) Inventors: Kengo Onaka, Nagaokakyo (JP); Ryo Komura, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 51 days.

(21) Appl. No.: 18/665,609

(22) Filed: May 16, 2024

(65) Prior Publication Data

US 2024/0304994 A1 Sep. 12, 2024

Related U.S. Application Data

(63) Continuation of application No. PCT/JP2022/042077, filed on Nov. 11, 2022.

(30) Foreign Application Priority Data

Nov. 24, 2021 (JP) ................................ 2021-190087

(51) Int. Cl.
*H01Q 1/22* (2006.01)
*H01Q 5/307* (2015.01)
*H01Q 9/04* (2006.01)
*H01Q 21/08* (2006.01)

(52) U.S. Cl.
CPC ......... *H01Q 9/0407* (2013.01); *H01Q 1/2283* (2013.01); *H01Q 5/307* (2015.01); *H01Q 21/08* (2013.01)

(58) Field of Classification Search
CPC ...... H01Q 1/2283; H01Q 1/38; H01Q 9/0407; H01Q 21/06–08; H01Q 23/00; H01L 2223/6677
See application file for complete search history.

(56) References Cited

U.S. PATENT DOCUMENTS 7,079,079 B2 * 7/2006 Jo ........................ H01Q 9/0442 343/702
11,276,926 B2 * 3/2022 Yun ........................ H01Q 1/243
12,316,006 B2 * 5/2025 Jang ...................... H01Q 9/0414
2019/0103653 A1 4/2019 Jeong et al.
(Continued)

FOREIGN PATENT DOCUMENTS

JP H02-126413 U 10/1990
JP H05-183328 A 7/1993

OTHER PUBLICATIONS

International Search Report and Written Opinion mailed on Jan. 24, 2023, received for PCT Application PCT/JP2022/042077, filed on Nov. 11, 2022, 8 pages including English Translation.

*Primary Examiner* — Hasan Islam
(74) *Attorney, Agent, or Firm* — XSENSUS LLP

(57) ABSTRACT

An antenna module includes a first substrate, a first component and a second component, a first radiating element and a second radiating element, and a second substrate that is arranged between the first substrate and the first component. The first component is thinner than the second component. The second substrate is arranged to overlap the first radiating element. The second component is arranged to overlap the second radiating element.

16 Claims, 14 Drawing Sheets

(56) References Cited

U.S. PATENT DOCUMENTS

| | | | |
|---|---|---|---|
| 2020/0144722 | A1 | 5/2020 | Seo et al. |
| 2020/0161749 | A1* | 5/2020 | Onaka .................... H01Q 21/24 |
| 2023/0014567 | A1* | 1/2023 | Yeon ................. H01L 23/49822 |

* cited by examiner

FIG.6

COMPARISON OF SINGLE DIRECTIVITY (PEAK GAIN), 28 GHz, V POLARIZED WAVE

| | RADIATING ELEMENT 120A | RADIATING ELEMENT 120B | RADIATING ELEMENT 120C | RADIATING ELEMENT 120D | RADIATING ELEMENT 120E |
|---|---|---|---|---|---|
| ADJUSTMENT SUBSTRATE IS NOT PROVIDED | 2.2dBi | 2.0dBi | 2.0dBi | 1.9dBi | 3.2dBi |
| ADJUSTMENT SUBSTRATE IS PROVIDED | 2.4dBi | 2.0dBi | 2.0dBi | 1.9dBi | 3.2dBi |

FIG.7

COMPARISON OF SINGLE DIRECTIVITY (PEAK GAIN DISTRIBUTION), 28 GHz, V POLARIZED WAVE

| | RADIATING ELEMENT 120A | RADIATING ELEMENT 120E |
|---|---|---|
| ADJUSTMENT SUBSTRATE IS NOT PROVIDED | 2.2dBi 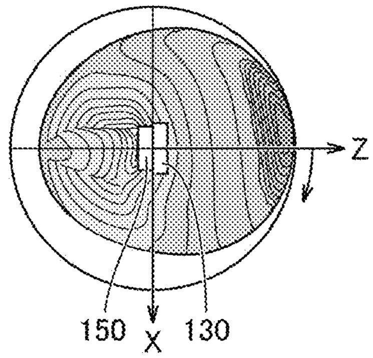  | 3.2dBi 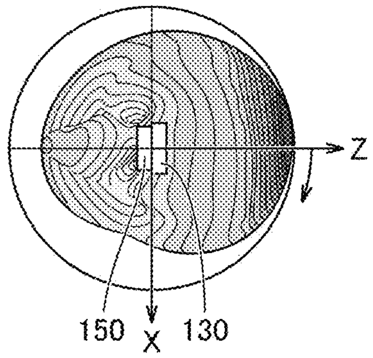  |
| ADJUSTMENT SUBSTRATE IS PROVIDED | 2.4dBi 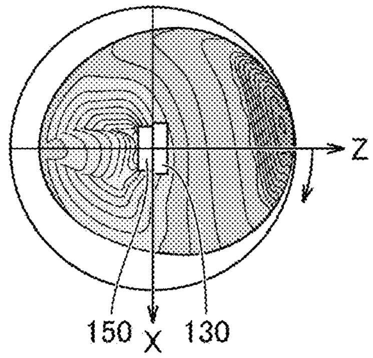  | 3.2dBi 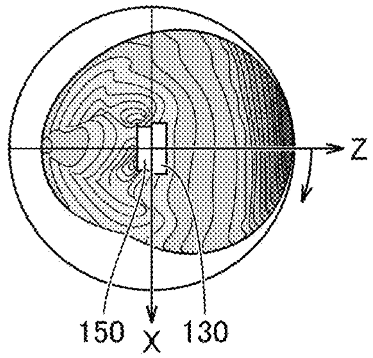  |

RADIATING ELEMENT 120A, COMPARISON OF SINGLE DIRECTIVITY (28 GHz/39 GHz, COMPARISON OF POLARIZED WAVES)

RETURN LOSS OF RADIATING ELEMENT 120A

ANTENNA MODULE AND COMMUNICATION APPARATUS EQUIPPED WITH THE SAME

CROSS-REFERENCE TO RELATED APPLICATIONS

This application is a Continuation of PCT International Application No. PCT/JP2022/042077, filed on Nov. 11, 2022, which claims priority under 35 U.S.C. § 119(a) to Patent Application No. JP 2021-190087, filed on Nov. 24, 2021, all of each are hereby expressly incorporated by reference into the present application.

TECHNICAL FIELD

The present disclosure relates to an antenna module and a communication apparatus equipped with the same, and more specifically, to a technique for improving antenna characteristics.

BACKGROUND ART

In FIG. 4 of U.S. Patent Application Publication No. 2019/0103653 (Patent Document 1), a configuration in which a power control IC, an RFIC, a plurality of antennas, a connector, and the like are disposed on one surface of a substrate of an antenna module is described. According to the description of Patent Document 1, the power control IC and the RFIC are shielded or sealed inside a mold.

In FIG. 11A of Patent Document 1, a configuration in which a plurality of patch antennas are disposed on one surface of a substrate of an antenna module and a rectangular parallelepiped component that may include an RFIC and a connector are disposed on another surface of the substrate is described. In the antenna module illustrated in FIG. 11A, three patch antennas are provided at positions that face the rectangular parallelepiped component with the substrate interposed therebetween and a patch antenna is provided at a position that faces the connector with the substrate interposed therebetween.

CITATION LIST

Patent Document

Patent Document 1: U.S. Patent Application Publication No. 2019/0103653

SUMMARY OF INVENTION

Technical Problem

In the antenna module described in Patent Document 1, the difference between the height of the rectangular parallelepiped component and the height of the connector may prevent the patch antennas from having the same antenna characteristics. In particular, as the difference in height increases and the width of a substrate surface in a polarization direction decreases, the area of a ground may be restricted more and the impact of a line of electric force going behind the substrate increases. Thus, characteristics of polarized waves emitted from the patch antennas in the direction of the width of the substrate surface may vary largely.

The present disclosure has been designed to solve the problem mentioned above, and an object of the present disclosure is to reduce variations in antenna characteristics that may occur in the case where a plurality of components are provided at a substrate at which a plurality of radiating elements are arranged.

Solution to Problem

An antenna module according to a first aspect of the present disclosure includes a first substrate that has a first surface and a second surface opposing each other, a first component and a second component that are arranged next to each other in a first direction near the second surface, a first radiating element and a second radiating element that are arranged next to each other in the first direction closer to the first surface than to the second surface at the first substrate, and a second substrate that is arranged between the first substrate and the first component. A thickness of the first component in a normal line direction of the first substrate is smaller than a thickness of the second component in the normal line direction of the first substrate. The second substrate is arranged to overlap the first radiating element when the antenna module is seen in plan view from the normal line direction of the first substrate. The second component is arranged to overlap the second radiating element when the antenna module is seen in plan view from the normal line direction of the first substrate.

An antenna module according to a second aspect of the present disclosure includes a first substrate, a first component and a second component, and a first radiating element and a second radiating element. The first substrate has a first surface, a second surface that opposes the first surface, and a third surface that opposes the first surface, an opposing distance between the third surface and the first surface being longer than an opposing distance between the first surface and the second surface. The first component is arranged on the third surface. The second component is arranged on the second surface. The first radiating element and the second radiating element are arranged in a direction in which the first component and the second component are arranged on a side closer to the first surface than to the second surface and the third surface at the first substrate. A thickness of the first component in a normal line direction of the first substrate is smaller than a thickness of the second component in the normal line direction of the first substrate. The third surface is arranged to overlap the first radiating element when the antenna module is seen in plan view from the normal line direction of the first substrate. The second component is arranged to overlap the second radiating element when the antenna module is seen in plan view from the normal line direction of the first substrate.

Advantageous Effects of Invention

In an antenna module according to the present disclosure, variations in antenna characteristics that may occur in the case where a plurality of components are provided at a substrate at which a plurality of radiating elements are arranged, can be reduced.

BRIEF DESCRIPTION OF DRAWINGS

FIG. 6 is a diagram for comparing peak gains of V polarized waves (28 GHz) of individual radiating elements arranged in the antenna module.

FIG. 7 is a diagram for comparing distributions of peak gains of V polarized waves (28 GHz) of two radiating elements disposed on both end sides of the antenna module.

DESCRIPTION OF EMBODIMENTS

Figure 1:
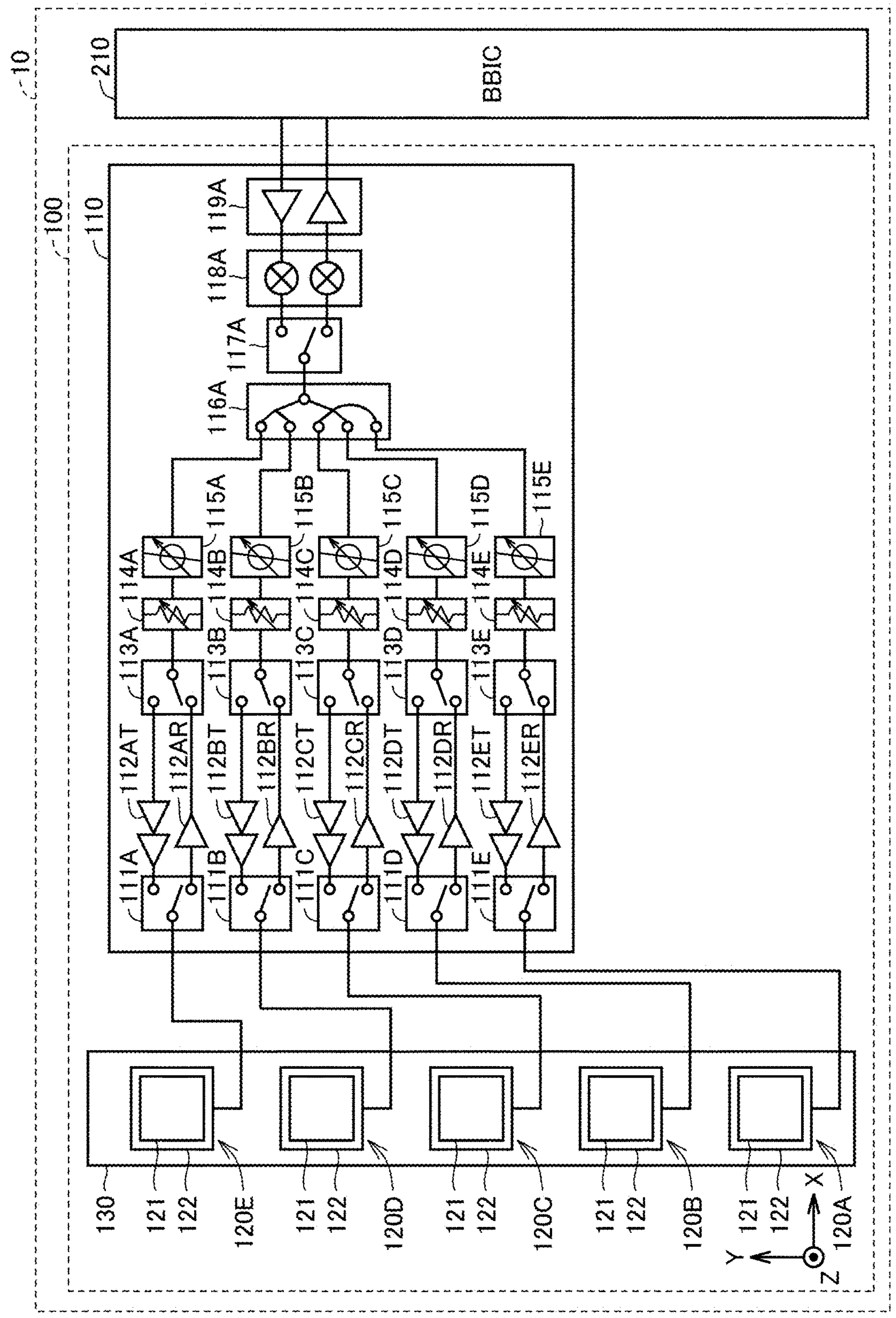
FIG. 1 is a block diagram of a communication apparatus for which an antenna module according to a first embodiment is used.

Hereinafter, embodiments of the present disclosure will be described in detail with reference to drawings. The same or corresponding parts in the drawings are denoted by the same signs and description of the same or corresponding parts will not be repeated.

First Embodiment (Basic Configuration of Communication Apparatus)

FIG. 1 is an example of a block diagram of a communication apparatus 10 for which an antenna module 100 according to a first embodiment is used. The communication apparatus 10 is, for example, a portable terminal such as a mobile phone, a smartphone, or a tablet, a personal computer provided with a communication function, a base station, or the like. Frequency bands of radio waves used for the antenna module 100 according to this embodiment are, for example, millimeter wave bands with center frequencies of, for example, 28 GHz and 39 GHz. Radio waves of frequency bands different from 28 GHz and 39 GHz may also be used for the antenna module 100 according to this embodiment.

Referring to FIG. 1, the communication apparatus 10 includes the antenna module 100 and a base band integrated circuit (BBIC) 210 configuring a baseband signal processing circuit. The antenna module 100 includes a dielectric substrate 130 at which five radiating elements 120A to 120E are arranged and a radio frequency integrated circuit (RFIC) 110, which is an example of a power supply circuit. Hereinafter, the radiating elements 120A to 120E may be comprehensively referred to as "radiating elements 120".

The radiating elements 120A to 120E have the same configurations. Each of the radiating elements 120A to 120E includes a pair of patch antennas 121 and 122 with different sizes. The patch antennas 121 and 122 each have a substantially square flat plate shape. Thus, each of the radiating elements 120 is an element with a planar shape. The element with the planar shape is not necessarily an element with a rectangular shape and may be an element with a circle or oval shape or an element with other types of polygons such as hexagon.

The BBIC 210 transmits intermediate frequency (IF) signals to the antenna module 100. The RFIC 110 of the antenna module 100 up-converts intermediate frequency signals into radio frequency (RF) signals. The RF signals are emitted from the radiating elements 120. The RFIC 110 down-converts RF signals received at the radiating elements 120 and transmits the down-converted signals to the BBIC 210.

A circuit configuration of the RFIC 110 will be described. The RFIC 110 includes five signal paths. Signals on the signal paths are distributed to the radiating elements 120A to 120E.

The RFIC 110 includes switches 111A to 111E, 113A to 113E, and 117A, power amplifiers 112AT to 112ET, low noise amplifiers 112AR to 112ER, attenuators 114A to 114E, phase shifters 115A to 115E, a signal multiplexer/demultiplexer 116A, a mixer 118A, and an amplifying circuit 119A.

For transmission of RF signals, the switches 111A to 111E and 113A to 113E are switched to the power amplifiers 112AT to 112ET side and the switch 117A is connected to a transmission-side amplifier in the amplifying circuit 119A. For reception of RF signals, the switches 111A to 111E and 113A to 113E are switched to the low noise amplifiers 112AR to 112ER side and the switch 117A is connected to a reception-side amplifier in the amplifying circuit 119A.

A signal transmitted from the BBIC 210 is amplified by the amplifying circuit 119A and up-converted by the mixer 118A. A transmission signal, which is the up-converted RF signal, is divided into five signals by the signal multiplexer/demultiplexer 116A. The divided signals travel through the five signal paths and are supplied to the radiating elements 120A to 120E. At this time, the degrees of phase shift of the phase shifters 115A to 115E, which are disposed at the signal paths, are adjusted individually, and the directivity of the entire antenna module 100 can thus be adjusted. Furthermore, the attenuators 114A to 114E adjust strength of transmission signals.

Reception signals, which are RF signals received at the radiating elements 120A to 120E, travel through corresponding signal paths and are combined by the signal multiplexer/demultiplexer 116A. The combined reception signal is down-converted by the mixer 118A, amplified by the amplifying circuit 119A, and transmitted to the BBIC 210.

(Configuration of Antenna Module)

Figure 2:
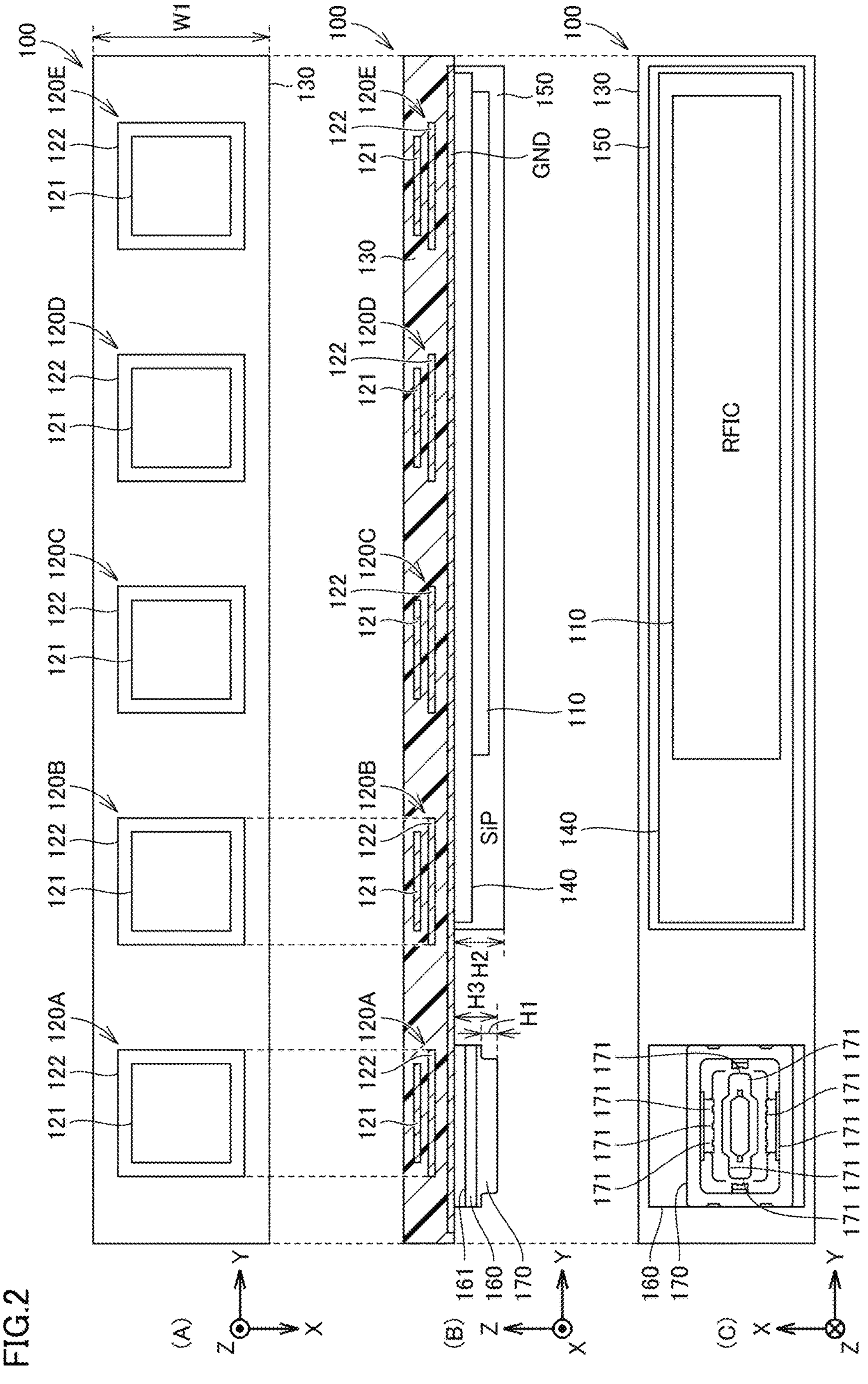
FIG. 2 includes a top view, a side perspective view, and a bottom view of the antenna module.

FIG. 2 includes a top view, a side perspective view, and a bottom view of the antenna module 100.

In FIG. 2(A), the top view of the antenna module 100 is illustrated. In FIG. 2(B), the side perspective view of the antenna module 100 is illustrated. In FIG. 2(C), the bottom view of the antenna module 100 is illustrated.

The antenna module 100 includes the dielectric substrate 130, the radiating elements 120A to 120E, a system in package (SiP) 150, an adjustment substrate 160, and a connector 170. Hereinafter, as illustrated in drawings, a normal line direction of a main surface of the dielectric substrate 130 may be referred to as a "Z-axis direction", a longitudinal direction of the dielectric substrate 130 that is perpendicular to the Z-axis direction may be referred to as a "Y-axis direction", and a direction perpendicular to both the Y-axis direction and the Z-axis direction may be referred to as an "X-axis direction". Furthermore, hereinafter, description may be provided by defining a Z-axis positive direction as a top surface side and a Z-axis negative direction as a bottom surface side in the drawings.

The dielectric substrate 130 has a rectangular shape when seen in plan view from the normal line direction (Z-axis direction). As illustrated in FIG. 2(A), the radiating elements 120A to 120E are arranged to be equally spaced in the Y-axis direction at the dielectric substrate 130. Each of the radiating elements 120A to 120E includes the pair of patch antennas 121 and 122. As illustrated in FIG. 2(B), the radiating elements 120A to 120E are disposed near the top surface of the dielectric substrate 130 inside the dielectric substrate 130. The radiating elements 120A to 120E may be arranged so as to be exposed out of the top surface of the dielectric substrate 130.

A ground electrode GND is arranged near the entire bottom surface of the dielectric substrate 130.

As illustrated in FIG. 2(A), the substrate width of the dielectric substrate 130 in the X-axis direction is represented by W1. To meet demands of reductions in size and thickness of the antenna module 100, it is desirable that the substrate width W1 be smaller. For example, in the case where the antenna module 100 is disposed on a side surface of a smartphone, a reduction in the substrate width W1 of the antenna module 100 contributes to reducing the thickness of the smartphone.

In this embodiment, the substrate width W1 is designed taking into consideration the wavelength of radio waves emitted from the radiating elements 120. In particular, the substrate width W1 is designed to be less than half the free space wavelength $\lambda 0$ of a radio wave of 28 GHz band. The ground electrode GND, which is arranged on the bottom surface side of the dielectric substrate 130, has an electrode width substantially the same as the substrate width W1, and the electrode width of the ground electrode GND varies according to the substrate width W1 of the dielectric substrate 130.

The dielectric substrate 130 is, for example, a low temperature co-fired ceramics (LTCC) multilayer substrate. The dielectric substrate 130 may be a multilayer resin substrate formed of laminated resin layers made of resin such as epoxy or polyimide.

The dielectric substrate 130 may be a multilayer resin substrate formed of laminated resin layers made of liquid crystal polymer (LCP) having a lower permittivity. The dielectric substrate 130 may be a multilayer resin substrate formed of laminated resin layers made of fluorine-based resin, a multilayer resin substrate formed of laminated resin layers made of a polyethylene terephthalate (PET) material, or a ceramics multilayer substrate made of a material different from LTCC.

The dielectric substrate 130 does not necessarily have a multilayer structure and may be a single layer substrate. As illustrated in FIG. 2(B) and FIG. 2(C), the SiP 150, the adjustment substrate 160, and the connector 170 are arranged on the bottom surface side of the dielectric substrate 130. A package of a processor, a memory, and the like is sealed in the SiP 150. The SiP 150 includes a substrate 140 on which the RFIC 110 is mounted. The RFIC 110 is electrically connected to the radiating elements 120A to 120E, and the SiP 150 may include a power management integrated circuit (PMIC), a power inductance, and the like. In this case, the PMIC, the power inductance, and the like are mounted on the substrate 140.

The connector 170 is arranged on the bottom surface side of the dielectric substrate 130 with the adjustment substrate 160 interposed therebetween. The connector 170 is, for example, a multi-pole connector. A plurality of terminals 171 are provided at the connector 170. A metal wiring layer 161 is formed inside the adjustment substrate 160. The adjustment substrate 160 has a three-layer structure including at least a mounting surface for the connector 170, the metal wiring layer 161, and a mounting surface for the dielectric substrate 130.

The adjustment substrate 160 is a so-called organic wiring substrate in which part of the adjustment substrate 160 is a dielectric and one or more resin insulating layers and one or more conductor layers are laminated. The adjustment substrate 160 may be an LCP substrate, a ceramic substrate, a polyimide substrate, or the like. The adjustment substrate 160 may be a multilayer substrate or a two-sided surface substrate. A matching chip component or a component such as a decoupling capacitor may be mounted at the adjustment substrate 160.

Wires (illustration is omitted in FIG. 2) for connecting the terminals 171 of the connector 170 to the SiP 150 are formed at the adjustment substrate 160 and the dielectric substrate 130.

Figure 3:
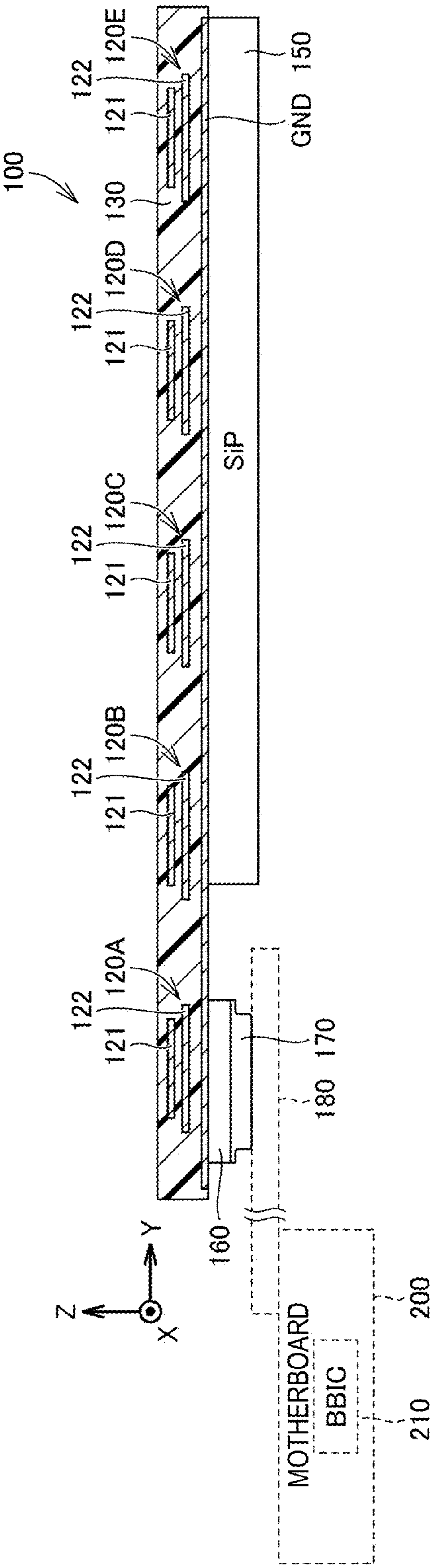
FIG. 3 is a diagram illustrating an example in which a motherboard is connected to the antenna module with a flexible substrate interposed therebetween.

FIG. 3 is a diagram illustrating an example in which a motherboard 200 is connected to the antenna module 100 with a flexible substrate 180 interposed therebetween. A plurality of terminals (illustration is omitted in FIG. 3) fitted to the connector 170 and a plurality of wires connecting the plurality of terminals to the motherboard 200 are provided at the flexible substrate 180.

For example, the BBIC 210 illustrated in FIG. 1 is mounted on the motherboard 200. An intermediate frequency signal is transmitted from the motherboard 200 to the antenna module 100. The flexible substrate 180 relays the intermediate frequency signal from the motherboard 200 and transmits the intermediate frequency signal to the connector 170. The motherboard 200 may be connected directly to the connector 170 without the flexible substrate 180 interposed therebetween.

(Configuration of Radiating Element)

Figure 4:
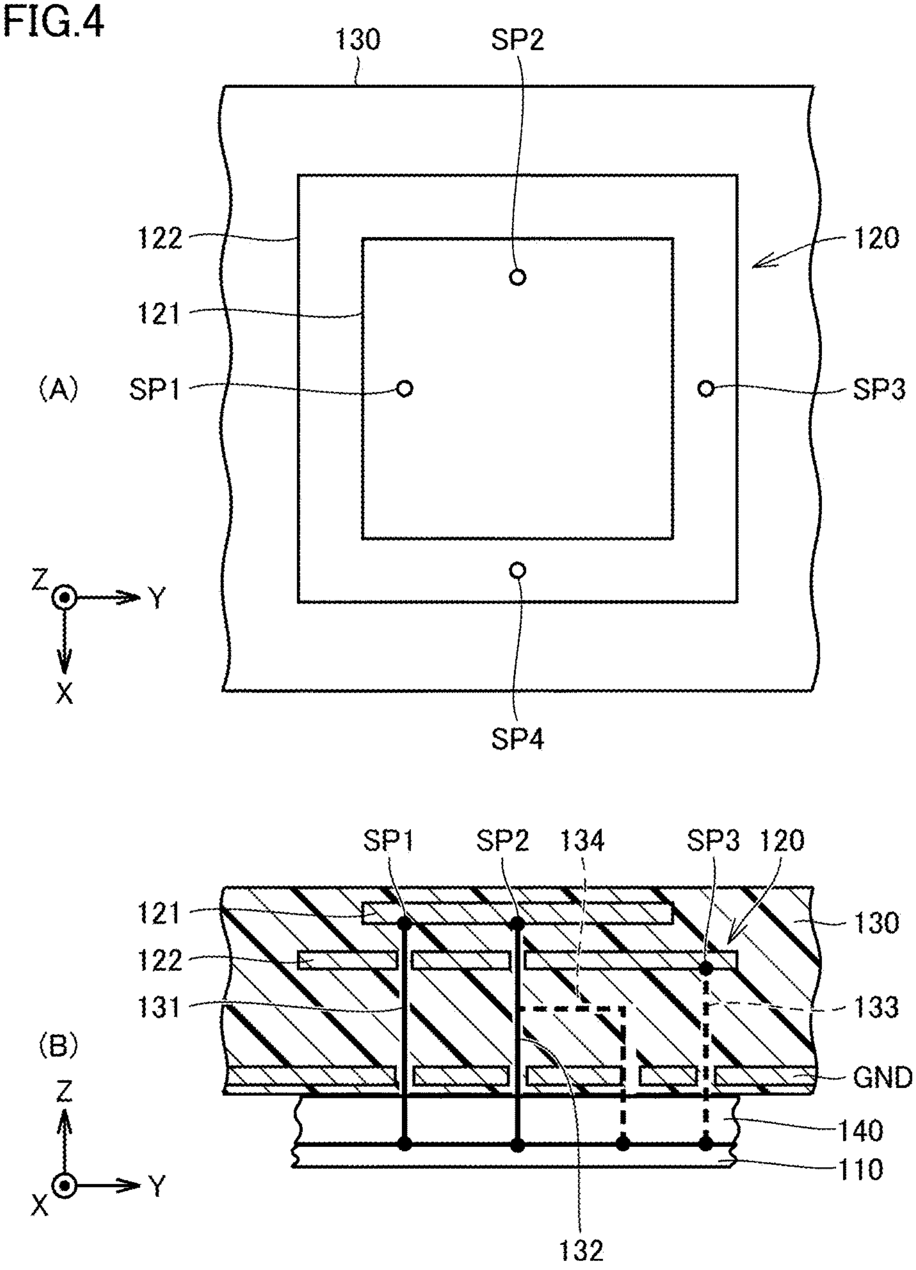
FIG. 4 includes a plan view and a side perspective view of a radiating element.

FIG. 4 includes a plan view and a side perspective view of a radiating element 120. In FIG. 4(A), the plan view of the radiating element 120 mounted at the dielectric substrate 130 is illustrated. In FIG. 4(B), the side perspective view of the radiating element 120 mounted at the dielectric substrate 130 is illustrated.

The antenna module 100 includes power supply wires 131 to 134 and the ground electrode GND, in addition to the RFIC 110, the radiating elements 120, and the dielectric substrate 130. The RFIC 110 is mounted, together with various circuits not illustrated in the drawing, at the substrate 140 sealed inside the SiP 150.

The ground electrode GND, which is arranged near the entire bottom surface of the dielectric substrate 130, faces the radiating elements 120.

The power supply wires 131 to 134 connect the RFIC 110 to power supply points of the radiating elements 120 with the substrate 140 interposed therebetween. The power supply wires 131 to 134 penetrate through the ground electrode GND. RF signals from the RFIC 110 are transmitted through the power supply wires 131 to 134 to the radiating elements 120.

Each of the radiating elements 120 includes the pair of patch antennas 121 and 122. The patch antenna 121 is arranged to be horizontal with respect to a plane formed by the X axis and the Y axis in such a manner that opposing two sides of the patch antenna 121 are parallel to the X axis or the Y axis. The patch antenna 122 are arranged in a similar manner. Furthermore, the patch antenna 121 and the patch antenna 122 are arranged such that the center position of the patch antenna 121 and the center position of the patch antenna 122 overlap in the Z-axis direction.

The patch antenna 121 is disposed at a position closer to the top surface side of the dielectric substrate 130 than the patch antenna 122 is. The flat plate size of the patch antenna 121 is smaller than the flat plate size of the patch antenna 122. The frequency of a radio wave output from the patch antenna 121 is higher than the frequency of a radio wave output from the patch antenna 122. The patch antenna 121 outputs, for example, radio waves of a millimeter wave band with a center frequency of 39 GHz. The patch antenna 122 outputs, for example, radio waves of a millimeter wave band with a center frequency of 28 GHz.

Two power supply points SP1 and SP2 are formed at the patch antenna 121. The power supply point SP1 is offset from the center of the patch antenna 121 in the Y-axis direction, and the power supply point SP2 is offset from the center of the patch antenna 121 in the X-axis direction. Thus, a radio wave polarized in the X-axis direction and a radio wave polarized in the Y-axis direction are emitted from the patch antenna 121.

The power supply point SP1 of the patch antenna 121 is connected, by the power supply wire 131, to the RFIC 110 with the substrate 140 interposed therebetween. The power supply point SP2 of the patch antenna 121 is connected, by the power supply wire 132, to the RFIC 110 with the substrate 140 interposed therebetween.

Two power supply points SP3 and SP4 are formed at the patch antenna 122. The power supply point SP3 is offset from the center of the patch antenna 122 in the Y-axis direction, and the power supply point SP4 is offset from the center of the patch antenna 122 in the X-axis direction. Thus, a radio wave polarized in the X-axis direction and a radio wave polarized in the Y-axis direction are emitted from the patch antenna 122.

The power supply point SP3 of the patch antenna 122 is connected, by the power supply wire 133, to the RFIC 110 with the substrate 140 interposed therebetween. The power supply point SP4 of the patch antenna 122 is connected, by the power supply wire 134, to the RFIC 110 with the substrate 140 interposed therebetween.

As described above, the patch antenna 121 outputs radio waves of a millimeter wave band with a center frequency of 39 GHz, and the patch antenna 122 outputs radio waves of a millimeter wave band with a center frequency of 28 GHz.

Thus, the radiating element 120 including the pair of patch antennas 121 and 122 is an antenna of a so-called dual-polarization, dual-band type. As illustrated in FIG. 1, the antenna module 100 is equipped with the five radiating elements 120 of such a dual-polarization, dual-band type.

Hereinafter, for a simpler explanation, radio waves polarized in the X-axis direction will be referred to as vertically (V) polarized waves, and radio waves polarized in the Y-axis direction will be referred to as horizontally (H) polarized waves. In this case, the radiating elements 120 can be defined as radiating elements capable of emitting radio waves having V polarization and radio waves having H polarization.

(Function of Adjustment Substrate 160 Relating to Improvement of Antenna Characteristics)

Referring back to FIG. 2, functions of the adjustment substrate 160 will be described. The adjustment substrate 160 is used with a purpose of improving the antenna characteristics of the antenna module 100. In particular, the adjustment substrate 160 is adopted in order to prevent the antenna characteristics of the radiating elements 120A to 120E from differing from each other. In this embodiment, by providing the adjustment substrate 160 between the dielectric substrate 130 and the connector 170, height H3 from the bottom surface of the dielectric substrate 130 to a terminal surface of the connector 170 is made closer to height H2 of the SiP 150.

The adjustment substrate 160 and the connector 170 are arranged to overlap the radiating element 120A when the dielectric substrate 130 is seen in plan view from the normal line direction. The SiP 150 is arranged to overlap the radiating elements 120B to 120E when the dielectric substrate 130 is seen in plan view from the normal line direction.

The height of the connector 170 in the Z-axis direction is represented by H1, and the height of the SiP 150 in the Z-axis direction is represented by H2. As is clear from the drawing, the height H1 of the connector 170 is lower than the height H2 of the SiP 150. Thus, if the connector 170 is attached directly to the bottom surface of the dielectric substrate 130 without the adjustment substrate 160 interposed therebetween, a step is formed in the antenna module 100 due to the difference between the height H1 of the connector 170 and the height H2 of the SiP 150 when the antenna module 100 is seen from the X-axis direction.

Each of the connector 170 and the SiP 150 may act as a dielectric for the antenna module 100, the dielectric having a permittivity different from that in a free space surrounding the antenna module 100. Thus, in the case where the connector 170 is connected directly to the dielectric substrate 130 without the adjustment substrate 160 interposed therebetween, the thickness of the dielectric (SiP 150) at a position overlapping the radiating elements 120B to 120E in the Z-axis direction and the thickness of the dielectric (connector 170) at a position overlapping the radiating element 120A in the Z-axis direction differ largely from each other.

In particular, characteristics of V polarized waves of the patch antennas 122 configuring the radiating elements 120 may vary between the radiating element 120A and the radiating elements 120B to 120E.

In a dual-polarization patch antenna, typically, a line of electric force extending from an end part of a radiating element 120 in the polarization direction towards the ground is generated. The permittivity of a path through which the line of electric force extends affects antenna characteristics of the patch antenna.

The line of electric force of the patch antenna 121 starts at the patch antenna 121 and terminates at the patch antenna 122 as the ground. In contrast, the line of electric force of the patch antenna 122 starts at the patch antenna 122 and terminates at the ground electrode GND, as the ground, which is disposed on the bottom surface side of the dielectric substrate 130. Thus, the size of the ground corresponding to the line of electric force of the patch antenna 122 depends on the substrate width W1 of the dielectric substrate 130.

The width of the ground electrode GND decreases as the substrate width W1 of the dielectric substrate 130 is reduced in order to meet the demands of reductions in size and thickness of the antenna module 100. This affects a line of electric force corresponding to a V polarized wave of the patch antenna 122, that is, a line of electric force rendered along the X-axis direction when the patch antenna 122 is seen in plan view from the normal line direction. This is because the ground electrode GND corresponds to the ground for the line of electric force.

Part of the line of electric force corresponding to a V polarized wave of the patch antenna 122 extends from an end part of the patch antenna 122 in the X-axis direction, passes through an air layer, forms a curve so as to wrap the short-width ground from the outside without immediately contacting the ground, and reaches the ground from the rear, so to speak.

At this time, the line of electric force entering the ground (ground electrode GND) from the rear passes through the air layer and is captured by the ground for the connector 170, the SiP 150, or the like mounted on the bottom surface side of the dielectric substrate 130 (in the case of the connector 170, the line of electric force is captured by a GND electrode of the connector, and in the case of the SiP 150, the line of electric force is captured by a GND electrode formed of a sputter shield on a surface).

As described above, in the case where the connector 170 is connected directly to the dielectric substrate 130 without the adjustment substrate 160 interposed therebetween, the thickness of the SiP 150 at the position that overlaps the radiating elements 120B to 120E in the Z-axis direction and the thickness of the connector 170 at the position that overlaps the radiating element 120A in the Z-axis direction differ largely from each other.

In the case where the thickness of the SiP 150 and the thickness of the connector 170 are different from each other, the effective permittivity of the path of a line of electric force passing through the SiP 150 and the effective permittivity of the path of a line of electric force passing through the connector 170 are different from each other.

This causes a difference between the characteristics of V polarized waves of the patch antennas 122 of the radiating elements 120B to 120E and the characteristics of V polarized waves of the patch antenna 122 of the radiating element 120A.

As the substrate width W1 of the dielectric substrate 130 is reduced in order to meet the demands of reductions in size and thickness of the antenna module 100, the difference in thickness between the connector 170 and the SiP 150 (H2−H1) with respect to the substrate width W1 increases.

When the ratio increases, many lines of electric force extending from the patch antennas 122 in association with V polarized waves enter the connector 170 or the SiP 150 at the rear of the ground and then enter the ground. Thus, as the difference in thickness between the connector 170 and the SiP 150 with respect to the ground width increases, the difference in antenna characteristics of V polarized waves of the patch antenna 122 between the radiating elements 120B to 120E and the radiating element 120A increases. In particular, when the ground width is less than or equal to a predetermined value, the impact of the difference in thickness between the connector 170 and the SiP 150 on the antenna characteristics increases.

In this embodiment, the substrate width W1 is set to be less than half the free space wavelength $\lambda 0$ of a radio wave of a band of 28 GHz emitted from the radiating element 120. This setting is configured to meet the demands of reductions in size and thickness of the antenna module 100. However, this setting may be a factor for making the antenna characteristics of the radiating element 120A and the antenna characteristics of the radiating elements 120B to 120E different from each other.

It is understood that the antenna characteristics of H polarized waves of the patch antenna 122 are less likely to be affected by the difference in thickness between the connector 170 and the SiP 150 and the substrate width W1. A line of electric force corresponding to an H polarized wave is rendered along the Y-axis direction when the patch antenna 122 is seen in plan view from the normal line direction. The ground corresponding to this line of electric force, that is, the ground electrode GND, extends widely in a direction orthogonal to the substrate width W1. Thus, the line of electric force corresponding to an H polarized wave reaches the ground electrode GND without going behind, unlike a line of electric force corresponding to a V polarized wave.

In contrast, it is understood that antenna characteristics of V polarized waves and H polarized waves of the patch antenna 121 are less likely to be affected by the difference in thickness between the connector 170 and the SiP 150 and the substrate width W1. This is because, since the ground for the patch antenna 121 is the patch antenna 122, which is larger in size than the patch antenna 121, there is no need to consider lines of electric force passing through the SiP 150 and the connector 170.

From the reasons described above, by providing the adjustment substrate 160 between the dielectric substrate 130 and the connector 170, the height H3 from the bottom surface of the dielectric substrate 130 to the terminal surface of the connector 170 is made closer to the height H2 of the SiP 150.

As described above, in this embodiment, by making the height H3 from the bottom surface of the dielectric substrate 130 to the terminal surface of the connector 170 closer to the height H2 of the SiP 150, the difference between the effective permittivity of the paths of lines of electric force of the radiating elements 120B to 120E and the effective permittivity of the path of a line of electric force of the radiating element 120A can be reduced. Thus, in this embodiment, the antenna characteristics of the antenna module 100 can be improved.

Although the relationship "H3<H2" is illustrated in FIG. 2(B), the height of the adjustment substrate 160 may be adjusted so that the relationship "H3=H2" is satisfied. Furthermore, as long as the height H3 from the bottom surface of the dielectric substrate 130 to the terminal surface of the connector 170 is made closer to the height H2 of the SiP 150, the relationship "H3<H2" may be satisfied.

In FIG. 2, an example in which the adjustment substrate 160 is arranged to overlap the entire radiating element 120A when the dielectric substrate 130 is seen in plan view from the normal line direction is illustrated. However, instead of this arrangement, the adjustment substrate 160 may be arranged to overlap part of the radiating element 120A when the dielectric substrate 130 is seen in plan view from the normal line direction. That is, in the present disclosure, "the adjustment substrate 160 is arranged to overlap the radiating element 120A" represents "the adjustment substrate 160 is arranged to overlap at least part of the radiating element 120A".

In the present disclosure, meaning of the term "overlap" should be understood in a similar manner also in the case where the relationship between the SiP 150 and the radiating element 120B and the relationship between the connector 170 and the radiating element 120A are mentioned. That is, in the present disclosure, "the SiP 150 is arranged to overlap the radiating element 120B" represents "the SiP 150 is arranged to overlap at least part of the radiating element 120B", and "the connector 170 is arranged to overlap the radiating element 120A" represents "the connector 170 is arranged to overlap at least part of the radiating element 120A".

In particular, in the case where the adjustment substrate 160 is arranged to overlap the entire radiating element 120A, peak gain toward a boresight direction of the directivity of the radiating element 120A can be improved compared to the case where the adjustment substrate 160 is arranged to overlap part of the radiating element 120A.

It is desirable that the adjustment substrate 160 be larger than the radiating element 120A when the antenna module 100 is seen from the normal line direction. This is because, if the adjustment substrate 160 is smaller than the radiating element 120A, the effect of increasing the ground width of the adjustment substrate 160 functioning as the ground for the radiating element 120A cannot be exhibited.

Data supporting functions of the adjustment substrate 160 relating to improvement of antenna characteristics are illustrated in FIGS. 5 to 8 and will be described with reference to FIGS. 5 to 8.

(Example of Improvement in Antenna Gain)

Figure 5:
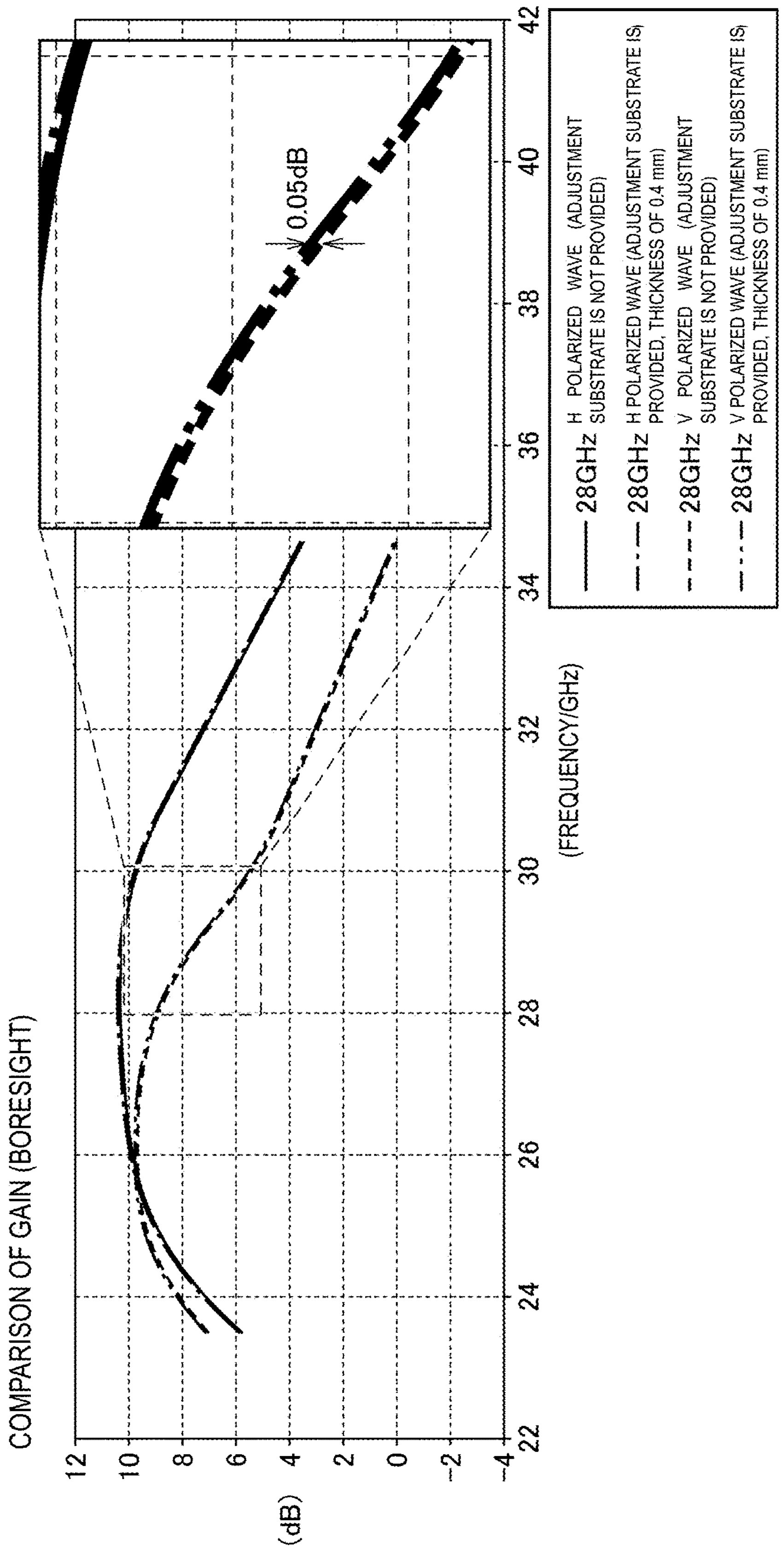
FIG. 5 is a diagram for comparing characteristics of V polarized waves and H polarized waves in the antenna module on the basis of whether or not an adjustment substrate is provided.

FIG. 5 is a diagram for comparing characteristics of V polarized waves and H polarized waves in the antenna module 100 on the basis of whether or not the adjustment substrate 160 is provided. In FIG. 5, for H polarized waves and V polarized waves of 28 GHz, a comparison between the case where the adjustment substrate 160 is attached to the antenna module 100 and the case where the adjustment substrate 160 is not attached to the antenna module 100 is performed. Gains indicated in FIG. 5 are composite gains of the radiating elements 120A to 120E emitting radio waves in the boresight direction (Z-axis direction).

As illustrated in FIG. 5, regarding H polarized waves of 28 GHz, substantially no difference in antenna gain in the boresight direction is found between the case where the adjustment substrate 160 is provided and the case where the adjustment substrate 160 is not provided. Regarding V polarized waves of 28 GHz, in the case where the adjustment substrate 160 is attached, an improvement of about 0.05 dB in the antenna gain in the boresight direction is found in a frequency range from about 24 GHz to about 30 GHz, compared to the case where the adjustment substrate 160 is not attached.

In the case of H polarized waves of 28 GHz, substantially no difference in antenna gain in the boresight direction is found between the case where the adjustment substrate 160 is provided and the case where the adjustment substrate 160 is not provided.

(Peak Gain of V Polarized Waves (28 GHz))

FIG. 6 is a diagram for comparing peak gains of V polarized waves (28 GHz) of the radiating elements 120A to 120E arranged in the antenna module 100. FIG. 7 is a diagram for comparing distributions of peak gains of V polarized waves (28 GHz) of two radiating elements 120A and 120E disposed on both end sides of the antenna module 100.

In FIGS. 6 and 7, examples of comparison between the case where the adjustment substrate 160 is attached to the antenna module 100 and the case where the adjustment substrate 160 is not attached to the antenna module 100 are illustrated. In particular, in FIG. 7, distributions of peak gains in the case where the antenna module 100 is seen from the Y-axis direction are illustrated. In FIG. 7, the higher the density of hatching is, the higher the gain is.

As is clear from FIG. 2 and described above, the radiating element 120A and the radiating element 120E are disposed at positions symmetrical to each other along the Y-axis direction when the antenna module 100 is seen from the X-axis direction. Similarly, the radiating element 120B and the radiating element 120D are disposed at positions symmetrical to each other along the Y-axis direction when the antenna module 100 is seen from the X-axis direction.

Thus, when only symmetry is taken into consideration, the antenna characteristics of the radiating element 120A and the radiating element 120E should be the same, and the antenna characteristics of the radiating element 120B and the radiating element 120D should be the same.

As illustrated in FIG. 6, peak gains of the radiating element 120B and the radiating element 120D do not change depending on whether or not the adjustment substrate 160 is provided, and there is only a gain difference of about 0.1 dB. However, there is a large difference in peak gain between the radiating element 120A and the radiating element 120E, and the difference can be reduced by attaching the adjustment substrate 160, as is clear from FIG. 6.

This supports the fact that the difference between the height of the dielectric (SiP 150) arranged to overlap the radiating elements 120B to 120E in the Z-axis direction and the height of the dielectric (connector 170) arranged to overlap the radiating element 120A in the Z-axis direction affects the difference in antenna characteristics between the radiating element 120A and the radiating element 120E. As illustrated in FIG. 6, by providing the adjustment substrate 160 between the dielectric substrate 130 and the connector 170, the antenna characteristics of the radiating element 120A is improved to be closer to the antenna characteristics of the radiating element 120E.

As illustrated in FIG. 7, an improvement toward the boresight direction in the peak gain distribution of the radiating element 120A is also found in the case where the adjustment substrate 160 is provided.

(Comparison of Directivity of Radiating Element 120A)

Figure 8:
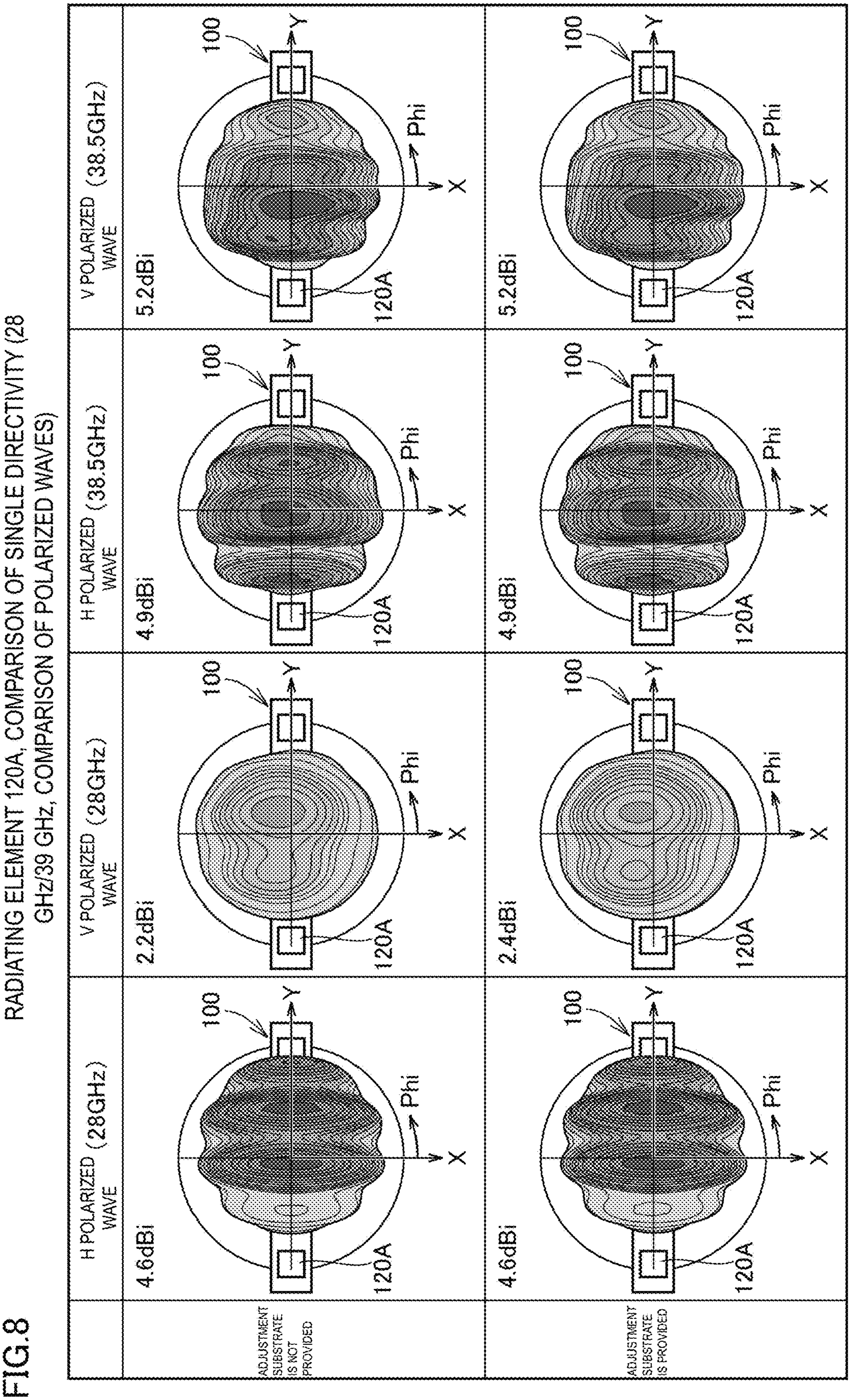
FIG. 8 is a diagram for comparing directivities of V polarized waves and H polarized waves of a radiating element that is arranged to overlap a connector in a Z-axis direction on the basis of whether or not an adjustment substrate is provided.

FIG. 8 is a diagram for comparing directivities of V polarized waves and H polarized waves of the radiating element 120A arranged to overlap the connector 170 in the Z-axis direction on the basis of whether or not the adjustment substrate 160 is provided.

FIG. 8 includes gain distribution diagrams. In particular, in FIG. 8, distributions of peak gains when the antenna module 100 is seen from the Z-axis direction are illustrated. In FIG. 8, the higher the density of hatching is, the higher the gain is.

As illustrated in FIG. 8, even if the adjustment substrate 160 is not provided, the peak gain of H polarized waves in the frequency range of 28 GHz reaches a high value of 4.6 dBi. In contrast, the peak gain of V polarized waves in the frequency range of 28 GHz is a low value of 2.2 dBi in the case where the adjustment substrate 160 is not provided. This is because the V polarized waves in the frequency range of 28 GHz are affected by the substrate width W1 of the dielectric substrate 130 (see FIG. 2). In other words, when the width of the ground electrode GND (see FIG. 2) corresponding to the ground for a line of electric force corresponding to a V polarized wave decreases, the characteristics of the V polarized wave degrade.

In the case where the adjustment substrate 160 is provided, the peak gain of V polarized waves in the frequency range of 28 GHz is improved to 2.4 dBi. Furthermore, in the case where the adjustment substrate 160 is provided, an improvement in the peak gain toward the boresight direction is found in the gain distribution of the V polarized waves in the frequency range of 28 GHz. This is an effect achieved by adding the adjustment substrate 160 to a position that overlaps the radiating element 120A in the Z-axis direction.

No difference in peak gain or gain distribution of the H polarized waves in the frequency range of 28 GHz is found between the case where the adjustment substrate 160 is provided and the case where the adjustment substrate 160 is not provided. This is because the ground (ground electrode GND) for a line of electric force corresponding to an H polarized wave in the frequency range of 28 GHz extends in the longitudinal direction of the dielectric substrate 130.

The H polarized waves in the frequency range of 28 GHz are output from the patch antenna 122. Since a line of electric force corresponding to the frequency range of 28 GHz extends towards the ground whose width is sufficiently larger than one side of the flat plate of the patch antenna 122, the line of electric force enters the ground without going behind the ground. Thus, the line of electric force is not affected by a dielectric, such as the adjustment substrate 160, arranged at the rear of the ground.

No difference in peak gain or gain distribution of V polarized waves and H polarized waves in the frequency range of 39 GHz is found between the case where the adjustment substrate 160 is provided and the case where the adjustment substrate 160 is not provided. This is because the patch antenna 122, which is largest in flat plate size out of the patch antennas 121 and 122 of the radiating element 120A, functions as the ground for lines of electric force corresponding to a V polarized wave and an H polarized wave in the frequency range of 39 GHz.

(Return Loss of Radiating Element 120A)

Figure 9:
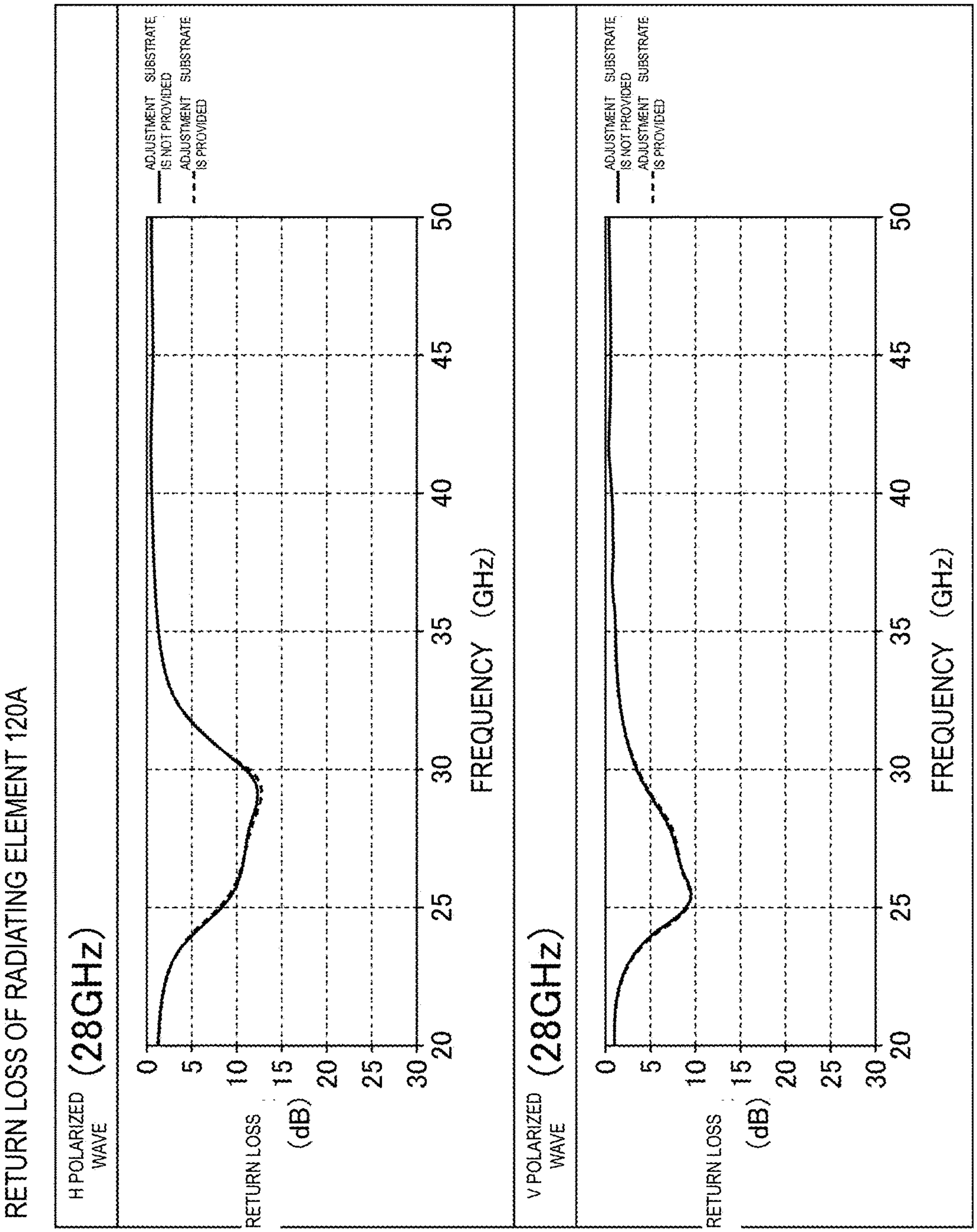
FIG. 9 is a diagram for comparing return losses of V polarized waves and H polarized waves of 28 GHz of the radiating element that is arranged to overlap the connector in the Z-axis direction on the basis of whether or not an adjustment substrate is provided.
Figure 10:
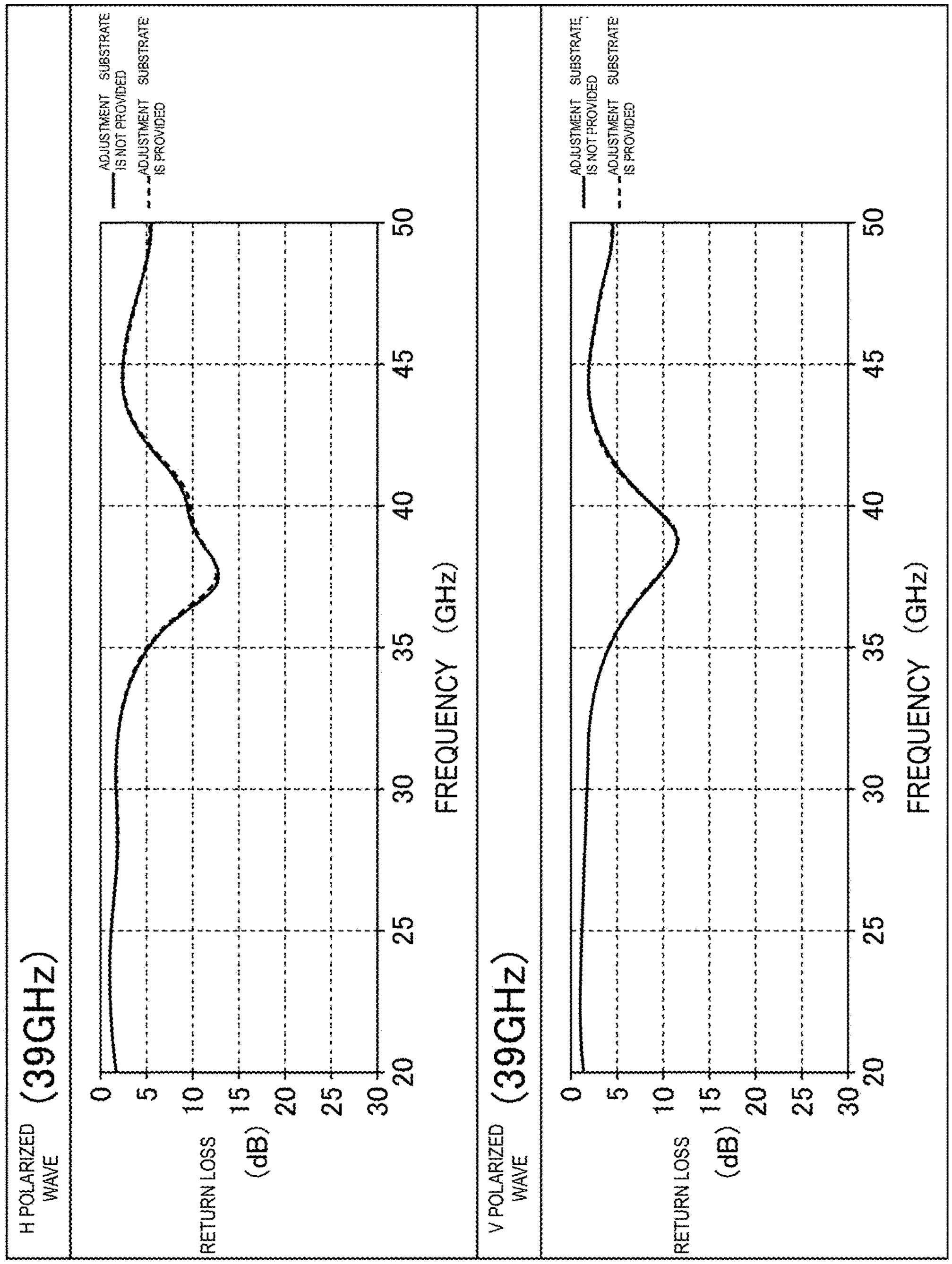
FIG. 10 is a diagram for comparing return losses of V polarized waves and H polarized waves of 39 GHz of the radiating element that is arranged to overlap the connector in the Z-axis direction on the basis of whether or not an adjustment substrate is provided.

FIGS. 9 and 10 are diagrams for comparing return losses of V polarized waves and H polarized waves of the radiating element 120A arranged to overlap the connector 170 in the Z-axis direction on the basis of whether or not the adjustment substrate 160 is provided. FIG. 9 illustrates the case of the frequency range of 28 GHz. FIG. 10 illustrates the case of the frequency range of 39 GHz.

In the graphs illustrated in FIGS. 9 and 10, no difference in return loss of V polarized waves and H polarized waves is found between the case where the adjustment substrate 160 is provided and the case where the adjustment substrate 160 is not provided. Thus, it is clear that presence or absence of the adjustment substrate 160 does not affect the impedance of the radiating element 120A. This means that the cause for an improvement in the antenna characteristics of V polarized waves of the radiating element 120A by provision of the adjustment substrate 160 has nothing to do with impedance. That is, return loss is not improved by provision of the adjustment substrate 160 and antenna efficiency is not increased by the improvement of the return loss.

In this embodiment, insertion of the adjustment substrate 160 between the dielectric substrate 130 and the connector 170 does not change input power but changes the directivity of the antenna. As a result, the antenna characteristics of the V polarized waves (28 GHz) of the radiating element 120A are improved.

As described above, in the antenna module 100 according to the first embodiment, by insertion of the adjustment substrate 160 between the dielectric substrate 130 and the connector 170, the difference in height between components that face the radiating elements 120A to 120E with the dielectric substrate 130 interposed therebetween can be adjusted.

Thus, the antenna characteristics of the radiating element 120A that faces the connector 170, which is larger in height than the SiP 150, can be improved. As a result, the antenna characteristics of the radiating elements 120B to 120E at positions facing the SiP 150 and the antenna characteristics of the radiating element 120A at a position facing the connector 170 can be made the same. This embodiment is effective for the case where the substrate width W1 of the dielectric substrate 130 is shorter. In particular, the present embodiment is more effective for the case where the substrate width W1 is less than half the free space wavelength λ0 of a radio wave emitted from the radiating element 120.

According to this embodiment, antenna characteristics that are as uniform as possible can be achieved while the demand of reducing the thickness of the antenna module 100 being met.

In the first embodiment, the radiating elements 120 are, for example, elements of the dual-polarization, dual-band type. However, in the present disclosure, elements of a single-polarization, single-band type may be adopted as the radiating elements 120 or elements of a dual-polarization, single-band type may be adopted as the radiating elements 120.

In the first embodiment, the connector 170 is an example of a first component, and the SiP 150 is an example of a second component. The radiating element 120A is an example of a first radiating element, and the radiating element 120B is an example of a second radiating element. Each of the first radiating element and the second radiating element is not limited to a pair of patch antennas. Each of the first radiating element and the second radiating element may be a single patch antenna.

Second Embodiment

Figure 11:
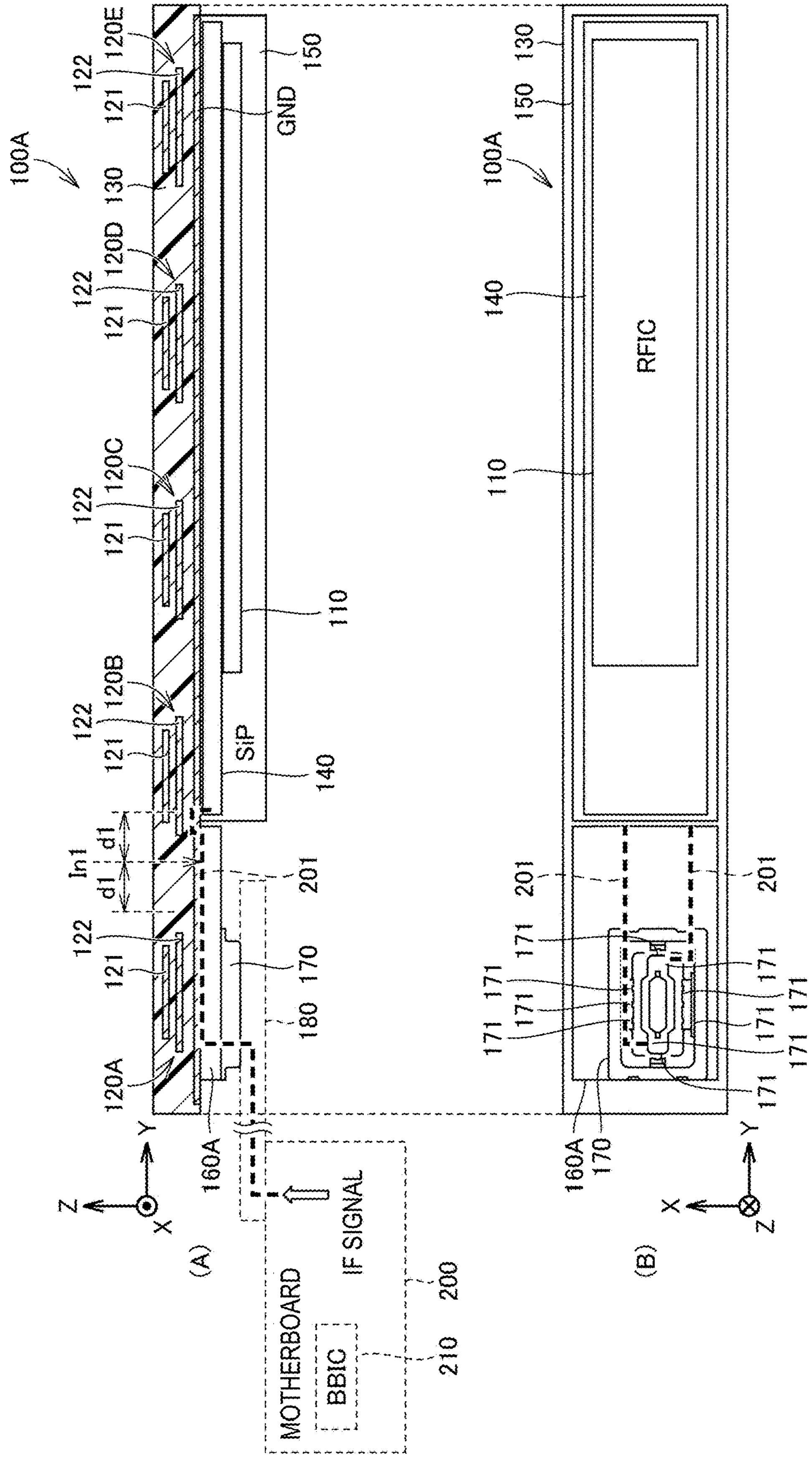
FIG. 11 includes a side perspective view and a bottom view of an antenna module according to a second embodiment.

FIG. 11 includes a side perspective view and a bottom view of an antenna module 100A according to a second embodiment. In the antenna module 100A according to the second embodiment, an adjustment substrate 160A that is larger in size than the adjustment substrate 160 is adopted. The antenna module 100A according to the second embodiment is different from the antenna module 100 according to the first embodiment in this respect.

The adjustment substrate 160A includes an extension area that extends towards a side facing the SiP 150 when the dielectric substrate 130 is seen in plan view from the normal line direction. An end part of the extension area extends to almost reach an end of the SiP 150. Thus, as illustrated in FIG. 11, the adjustment substrate 160A extends closer to the radiating element 120B than to an intermediate position In1 between the radiating element 120A and the radiating element 120B.

A transmission line 201 passing through the adjustment substrate 160A and then extending from the connector 170 towards the SiP 150 is formed between the connector 170 and the SiP 150. The transmission line 201 is, for example, connected to the motherboard 200 with the flexible substrate 180 interposed therebetween. The motherboard 200 transmits an intermediate frequency signal to the transmission line 201 through the flexible substrate 180.

As illustrated in FIG. 11, in the second embodiment, the transmission line 201 passes through a substrate surface of the dielectric substrate 130. The transmission line 201, which passes through the substrate surface of the dielectric substrate 130, is covered with a substrate surface of the adjustment substrate 160A. Thus, the transmission line 201 is formed on a bonding surface between the dielectric substrate 130 and the adjustment substrate 160A.

An intermediate frequency signal corresponding to a millimeter wave band is as high as about 8 GHz to about 15 GHz. Thus, compared to an intermediate frequency signal of a lower frequency band, wiring loss is relatively large. Therefore, in particular, in an antenna module that processes radio waves of a millimeter wave band, it is highly necessary to shield a transmission line for an intermediate frequency signal.

In the case where the adjustment substrate 160A is not provided at the dielectric substrate 130, a wiring layer inside the dielectric substrate 130 needs to form such a transmission line. In this case, such a transmission line needs to be formed at the dielectric substrate 130 separately in such a manner that the transmission line bypasses an antenna wiring layer formed at the dielectric substrate 130 in order that the transmission line does not affect the antenna wiring layer.

In particular, since each of the radiating elements 120 is an antenna of a so-called dual-polarization, dual-band type, the four power supply wires 131 to 134 are provided. Thus, wiring including the radiating elements 120 accounts for a significantly large proportion of the thickness of the substrate layer of the dielectric substrate 130 in the Z-axis direction. Hence, it is not easy to arrange a transmission line for an intermediate frequency signal in the dielectric substrate 130 in such a manner that the transmission line extends from the position of the connector 170, which is an end of the dielectric substrate 130, to the SiP 150. Furthermore, since the transmission line needs to be formed so as to avoid the wiring layer inside the dielectric substrate 130, the length of the transmission line increases.

In the second embodiment, the adjustment substrate 160A, which extends from the position of the connector 170 to the position of the SiP 150, is adopted, and the transmission line 201 for an intermediate frequency signal is formed between the adjustment substrate 160A and the dielectric substrate 130.

Since the dielectric substrate 130 is used as a substrate at which the radiating elements 120 are mounted, the dielectric substrate 130 has a low dielectric loss tangent and is significantly excellent in characteristics and quality compared to the adjustment substrate 160A. Thus, by providing the transmission line 201 on a surface of the dielectric substrate 130, which is excellent in characteristics and quality, and shielding the transmission line 201 with the adjustment substrate 160A, wiring loss can be prevented effectively.

According to the second embodiment, the transmission line 201 with a line length that is as short as possible and with wiring loss that is as low as possible can be formed. An end part of the adjustment substrate 160A may be arranged to be completely in contact with an end part of the SiP 150.

Furthermore, according to the second embodiment, a demand for a change in specifications of the connector 170 can be handled flexibly. Typically, a wide variety of demands are made for multi-pole connectors of antenna modules.

For example, in order to improve the isolation between two transmission lines 201 through which intermediate frequency signals are transmitted, more excellent shield characteristics may be demanded. Furthermore, the demand of increasing the distance between two terminals corresponding to two transmission lines 201 through which intermediate frequency signals are transmitted may be made.

In the case where the adjustment substrate 160A is not provided at the antenna module, the type of the antenna module including the dielectric substrate 130 and the SiP 150 needs to be changed. This serves as a factor for the decrease in the production efficiency of antenna modules. However, in the antenna module 100A according to this embodiment, the adjustment substrate 160A is provided. Thus, if there is a demand for such a change in specifications, the demand can be handled by maintaining a mounting surface of the dielectric substrate 130 for the adjustment substrate 160A and changing the adjustment substrate 160A to support the specifications of the connector 170.

For example, the flexible substrate 180 or a connecting component such as a flexible cable is connected to the connector 170. Thus, height near the connector 170 in the Z-axis direction is increased by the connecting component. In this case, there might be a demand of changing the thickness of the connector 170 so that the height increased by the connecting component and the height of the SiP 150 become the same.

In the case where the adjustment substrate 160A is not provided at the antenna module, the thickness of the dielectric substrate 130 in the Z-axis direction needs to be changed in order to meet the demand. Since the adjustment substrate 160A is provided at the antenna module 100A, the demand can be satisfied relatively easily by changing the size of the adjustment substrate 160A in the Z-axis direction.

As described above, the adjustment substrate 160A exhibits not only a function for adjusting the antenna characteristics but also a function for adjusting the configuration of the antenna module 100A in response to a request for a change in specifications of the connector 170.

Figure 12:
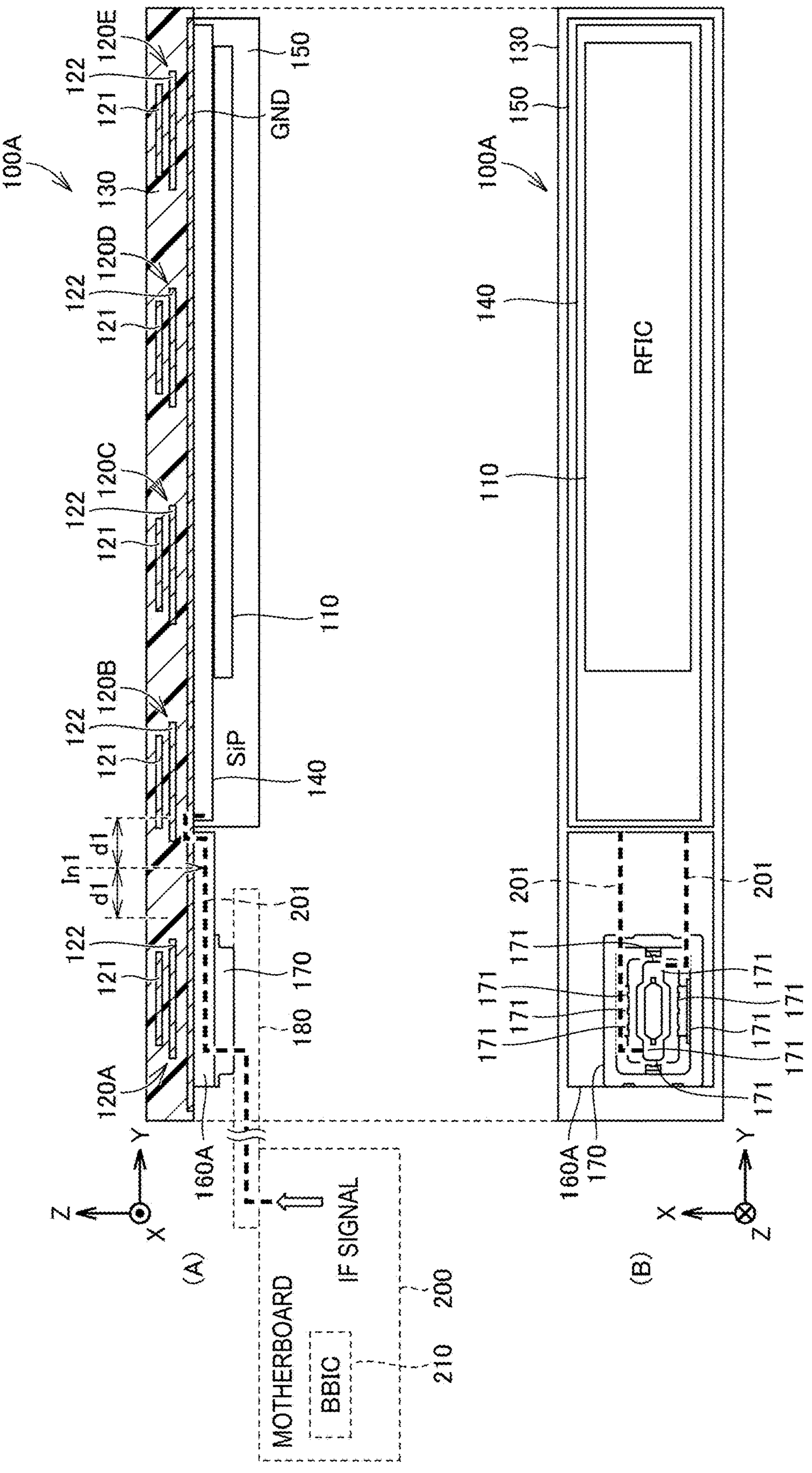
FIG. 12 includes diagrams illustrating an example in which a transmission line is provided inside an adjustment substrate.

The transmission line 201 extending inside the adjustment substrate 160A may be provided. In FIG. 12, an example in which the transmission line 201 is provided inside the adjustment substrate 160A is illustrated.

Third Embodiment

Figure 13:
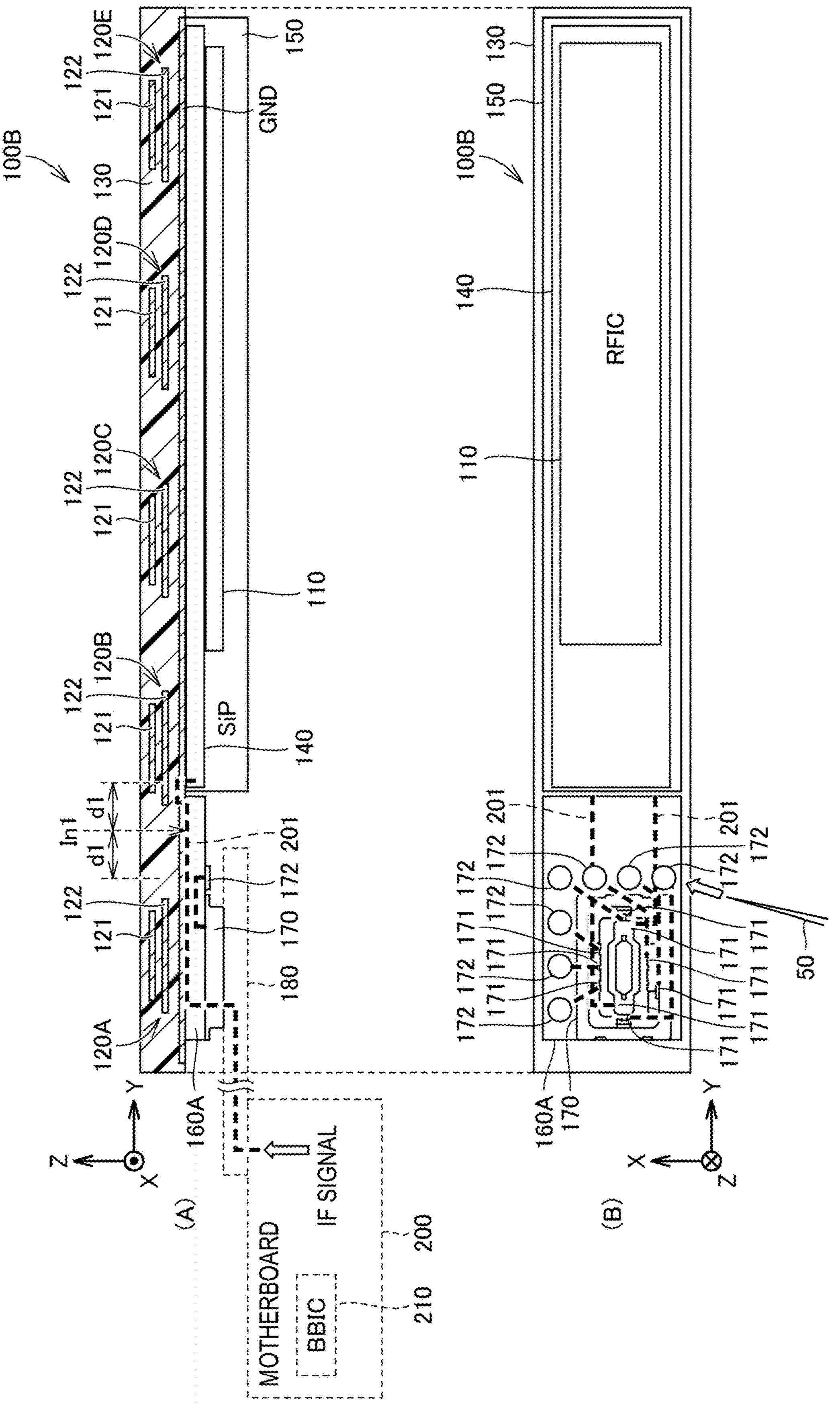
FIG. 13 includes a bottom view of an antenna module according to a third embodiment.

FIG. 13 includes a bottom view of an antenna module 100B according to a third embodiment. The antenna module 100B according to the third embodiment is obtained by adding a plurality of pads 172 having conductivity to the adjustment substrate 160A of the antenna module 100A according to the second embodiment. The plurality of pads 172 are provided to form a letter L around the connector 170.

The pads 172 are connected to the terminals 171 of the connector 170 by wires inside the adjustment substrate 160A. For example, by making a testing probe 50 in contact with the pads 172, a continuity test for a circuit including a wire extending from the terminals 171 to the SiP 150 can be conducted without making the terminals 171 in direct contact with the probe 50.

In general, in a continuity test for a circuit including a wire extending from a multi-pole connector to a SiP or other components, a person who conducts the test makes the probe 50 in direct contact with each terminal formed at the multi-pole connector. However, terminal parts of the multi-pole connector are formed extremely precisely. For example, the height of pins in the depth direction of the multi-pole connector differs depending on the terminals, and the pins are small in size. Therefore, it is difficult to precisely make the tip of the probe 50 hit a target pin. Furthermore, repetitive action of making the probe 50 hit the same pin may distort the arrangement of the pin.

According to the third embodiment, a continuity test can be conducted without making the probe 50 in direct contact with the terminals 171 of the connector 170. Thus, according to the third embodiment, the work efficiency of the continuity test using the probe 50 can be improved, and the terminals 171 of the connector 170 can be prevented from being adversely affected by the continuity test.

Furthermore, the pads 172, together with wires connecting to the terminals 171 of the connector 170, can function as open stubs configuring a matching circuit, so to speak. Thus, when the connector 170 is fitted to the adjustment substrate 160A, matching can be easily achieved by using the function of the pads 172 as open stubs.

The pads 172 may be provided so as to surround the connector 170. The configuration including the pads 172 may be used for the configuration of the antenna module 100A in FIG. 11 or FIG. 12.

First Modification

Figure 14:
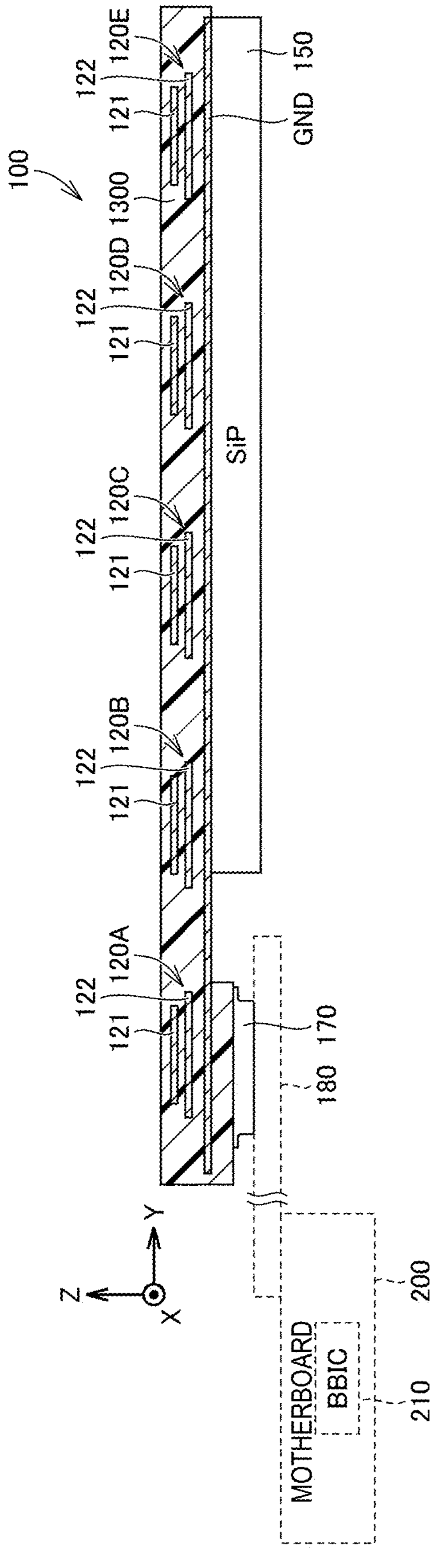
FIG. 14 is a side perspective view of an antenna module according to a first modification.

FIG. 14 is a side perspective view of the antenna module 100 according to a first modification. The first modification of the antenna module 100 described above as the first embodiment will be described below. Obviously, however, the first modification is also applicable to the second embodiment and the third embodiment.

In the first modification illustrated in FIG. 14, the dielectric substrate 130 and the adjustment substrate 160 illustrated in FIG. 3 are integrated into a dielectric substrate 1300. When the first modification is applied to the second and third embodiments, the dielectric substrate 130 and the adjustment substrate 160A are integrated into the dielectric substrate 1300.

In the first to third embodiments described above with reference to FIGS. 1 to 13, the top surface of the dielectric substrate 130 forms a first surface, and the bottom surface of the dielectric substrate 130 forms a second surface. In contrast, in the first modification, a top surface of the dielectric substrate 1300 forms a first surface, a part of a bottom surface of the dielectric substrate 1300 on which the SiP 150 is disposed forms a second surface, and a part of the bottom surface of the dielectric substrate 1300 on which the connector 170 is disposed forms a third surface. As illustrated in FIG. 14, the opposing distance between the top surface of the dielectric substrate 1300 and the surface on which the connector 170 is disposed is longer than the opposing distance between the top surface of the dielectric substrate 1300 and the surface on which the SiP 150 is disposed.

Second Modification

Figure 15:
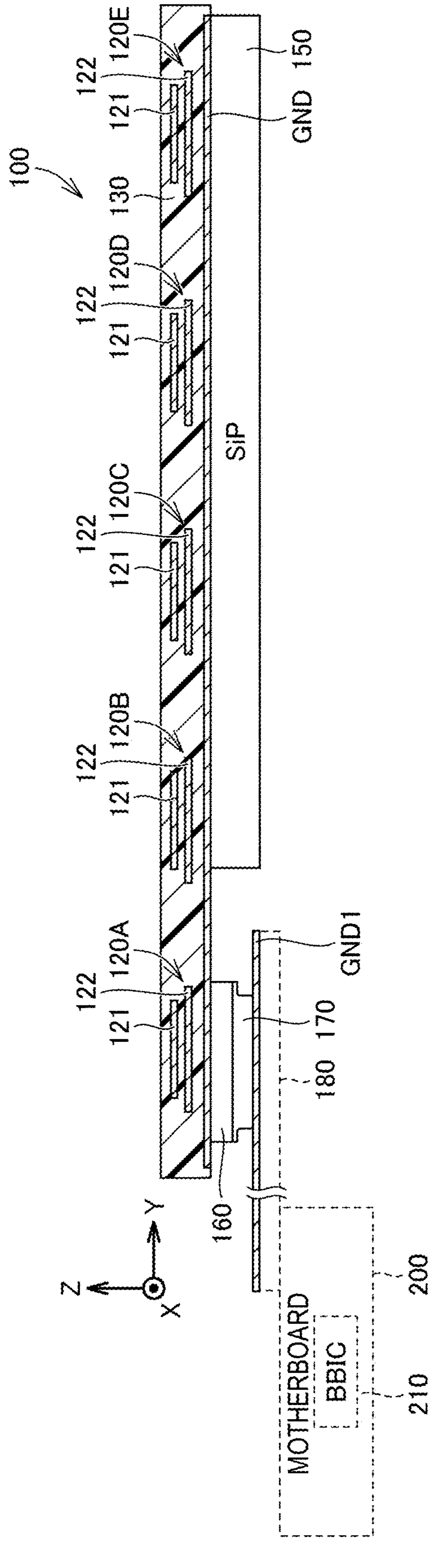
FIG. 15 is a side perspective view of an antenna module according to a second modification.

FIG. 15 is a side perspective view of the antenna module 100 according to a second modification. The second modification of the antenna module 100 described above as the first embodiment will be described below. Obviously, however, the second modification is also applicable to the second embodiment and the third embodiment.

In the second modification illustrated in FIG. 15, a ground electrode GND1 is arranged on the flexible substrate 180. The ground electrode GND1 is arranged in such a manner that at least part of the ground electrode GND1 overlaps the radiating element 120A when the dielectric substrate 130 is seen in plan view from the normal line direction. Thus, the ground electrode GND1 functions as a ground for the radiating element 120A, as with the adjustment substrate 160. According to the second modification, the antenna characteristics of the antenna module 100 can further be improved.

The embodiments disclosed herein are to be considered in all respects to be illustrative and not restrictive. The scope of the present invention is defined by the claims, rather than the embodiments described above, and is intended to include all modifications within the meaning and scope equivalent to the scope of the claims.

REFERENCE SIGNS LIST

10 communication apparatus, 50 probe, 100, 100A, 100B antenna module, 110, 110A to 110D RFIC, 111A to 111E, 113A to 113E, 117 switch, 112AR to 112ER low noise amplifier, 112AT to 112ET power amplifier, 114A to 114D attenuator, 115A to 115D phase shifter, 116A signal multiplexer/demultiplexer, 118A mixer, 119A amplifying circuit, 121, 122 patch antenna, 120, 120A to 120E radiating element, 130, 1300 dielectric substrate, 131 to 134 power supply wire, 140 substrate, 150 SiP, 160, 160A adjustment substrate, 161 metal wiring layer, 170 connector, 171 terminal, 172 pad, 180 flexible substrate, 200 motherboard, 201 transmission line, 210 BBIC, d1 distance, In1 intermediate position, GND, GND1 ground electrode, H1, H2 height, SP1 to SP4 power supply point, W1 substrate width.

The invention claimed is:

1. An antenna module comprising:
- a first substrate including a first surface, and a second surface opposite to the first surface;
- a multi-pole connector;
- a system in package (SiP) including a radio frequency integrated circuit (RFIC) arranged adjacent to the connector in a first direction near the second surface;
- a first radiating patch element;
- a second radiating patch element arranged symmetrically adjacent to the first radiating patch element in the first direction and at the first substrate; and
- a second substrate arranged between the first substrate and the connector,
- wherein power supply wires connect the RFIC to supply points of the first and second radiating patch elements,
- wherein a thickness of the connector in a normal line direction of the first substrate is smaller than a thickness of the SiP in the normal line direction of the first substrate,
- wherein the second substrate overlaps the first radiating patch element when the antenna module is seen in a plan view from the normal line direction of the first substrate, and
- wherein the SiP overlaps the second radiating patch element when the antenna module is seen in the plan view.

2. The antenna module according to claim 1, wherein a dimension of the first substrate in a second direction is less than half a free space wavelength of radio waves emitted from the first radiating patch element and the second radiating patch element, the second direction being orthogonal to the first direction.

3. The antenna module according to claim 1, wherein each of the first radiating patch element and the second radiating patch element has a planar shape.

4. The antenna module according to claim 1, wherein the connector overlaps the first radiating patch element when the antenna module is seen in the plan view from the normal line direction of the first substrate.

5. The antenna module according to claim 1, wherein the connector electrically connects an external substrate to the SiP.

6. The antenna module according to claim 5, wherein the second substrate is larger than the connector and includes an extension area that extends to at least part of an area around the connector when the antenna module is seen in the plan view, wherein a part of the extension area that is formed on a side facing the SiP extends to a position closer to the second radiating patch element than to an intermediate position between the first radiating patch element and the second radiating patch element when the antenna module is seen in the plan view, wherein the antenna module further includes a transmission line through which an intermediate frequency signal is transmitted from the connector to the SiP, the transmission line being arranged between the connector and the SiP, and wherein the transmission line is covered with a part of the second substrate corresponding to the extension area.

7. The antenna module according to claim 6, wherein the transmission line is arranged on a bonding surface between the first substrate and the second substrate.

8. The antenna module according to claim 6, wherein the transmission line is arranged inside the second substrate.

9. The antenna module according to claim 6, wherein the connector includes a terminal connected to the SiP by the transmission line, and wherein the SiP includes a pad that is arranged in the extension area, the pad being electrically connected to the terminal.

10. The antenna module according to claim 9, wherein the pad functions as a matching circuit.

11. The antenna module according to claim 1, wherein the SiP is connected to the first radiating patch element and the second radiating patch element.

12. The antenna module according to claim 1, wherein the first radiating patch element and the second radiating patch element are capable of emitting a radio wave that is polarized in the first direction and a radio wave that is polarized in a second direction different from the first direction.

13. The antenna module according to claim 1, wherein each of the first radiating patch element and the second radiating patch element includes:

a first electrode emitting a radio wave of a first frequency band; and a second electrode emitting a radio wave of a second frequency band different from the first frequency band of the first electrode.

14. A communication apparatus including:

the antenna module according to claim 1; and a base band integrated circuit (BBIC) configuring a baseband signal processing circuit.

15. The antenna module according to claim 1, wherein the connector is arranged below the second substrate.

16. The antenna module according to claim 1, wherein the second substrate includes a mounting surface, and wherein the connector is mounted to the mounting surface of the second substrate.

* * * * *